(12) United States Patent
Lii et al.

(10) Patent No.: US 8,013,842 B2
(45) Date of Patent: Sep. 6, 2011

(54) METHOD FOR GESTURE DETECTION ON A CAPACITIVE TOUCHPAD

(75) Inventors: Jia-Yih Lii, Taichung (TW); Yung-Lieh Chien, Taoyuan (TW)

(73) Assignee: Elan Microelectronics Corporation, Hsinchu (TW)

( * ) Notice: Subject to any disclaimer, the term of this patent is extended or adjusted under 35 U.S.C. 154(b) by 794 days.

(21) Appl. No.: 11/584,615

(22) Filed: Oct. 23, 2006

(65) Prior Publication Data

US 2007/0091077 A1 Apr. 26, 2007

(30) Foreign Application Priority Data

Oct. 25, 2005 (TW) .............................. 94137356 A (51) Int. Cl.
*G06F 3/041* (2006.01)

(52) U.S. Cl. ....................................................... 345/173
(58) Field of Classification Search .......... 345/156–175; 178/18.01, 19.03; 463/37
See application file for complete search history.

(56) References Cited

U.S. PATENT DOCUMENTS

| | | | |
|---|---|---|---|
| 5,880,411 A * | 3/1999 | Gillespie et al. ............ | 178/18.01 |
| 2004/0056847 A1* | 3/2004 | Yoshihara ..................... | 345/173 |
| 2006/0197750 A1* | 9/2006 | Kerr et al. ..................... | 345/173 |

* cited by examiner

*Primary Examiner* — Richard Hjerpe
*Assistant Examiner* — Carolyn R Edwards
(74) *Attorney, Agent, or Firm* — Rosenberg Klein & Lee (57) ABSTRACT

In a gesture detection method for a capacitive touchpad, various gesture operations are determined by detecting the touching on the touchpad, leaving from the touchpad, and moving on the touchpad.

21 Claims, 9 Drawing Sheets

Prior Art

Fig. 1

Prior Art

METHOD FOR GESTURE DETECTION ON A CAPACITIVE TOUCHPAD

RELATED APPLICATIONS

This Application claims foreign application priority upon Taiwan Application No. 094137356, filed 25 Oct. 2005.

FIELD OF THE INVENTION

The present invention is related generally to a touchpad and, more particularly, to a method for gesture detection on a capacitive touchpad.

BACKGROUND OF THE INVENTION

Capacitive touchpad is an input device that allows user to slide his finger on a smooth panel thereof for cursor movement control. Because of its very small thickness, capacitive touchpad can be designed in slim notebooks, keyboards, digital media players and other devices, and moreover, due to its non-mechanical design it is virtually maintenance free.

Figure 1:
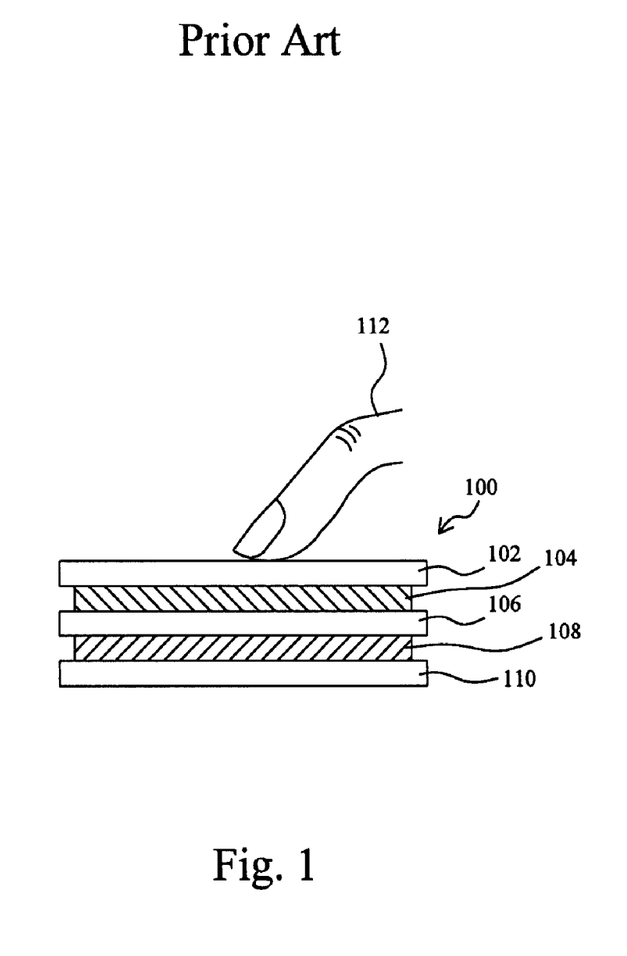
FIG. 1 is a cross-sectional view of a conventional two-dimensional capacitive touchpad.
Figure 2:
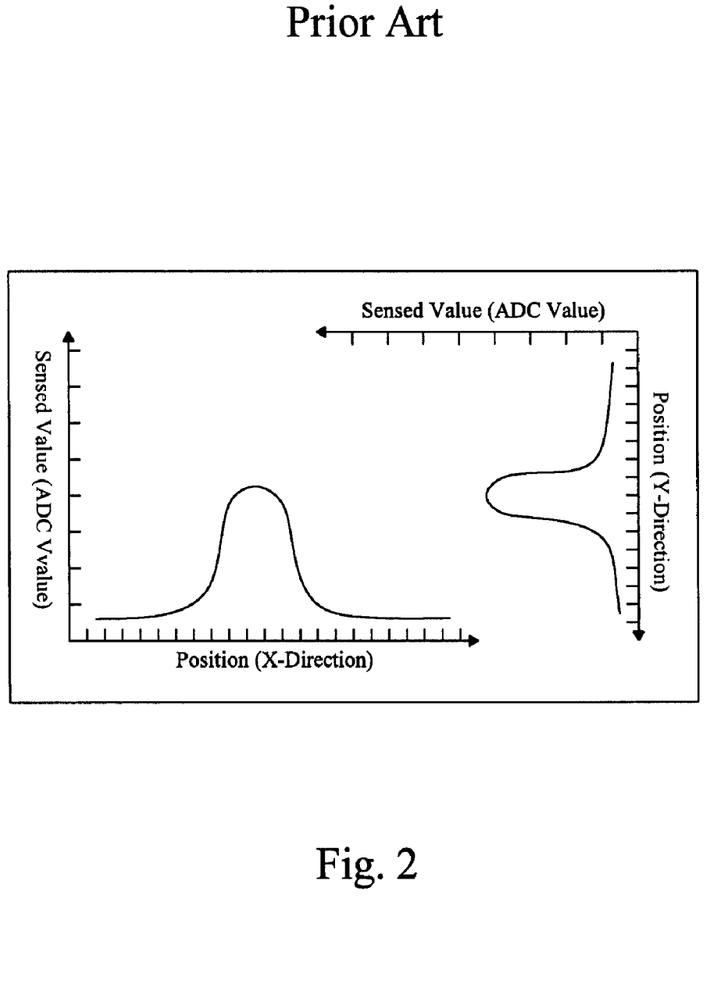
FIG. 2 shows a relationship between the sensed value and the touched position of the touchpad shown in FIG. 1.
Figure 3:
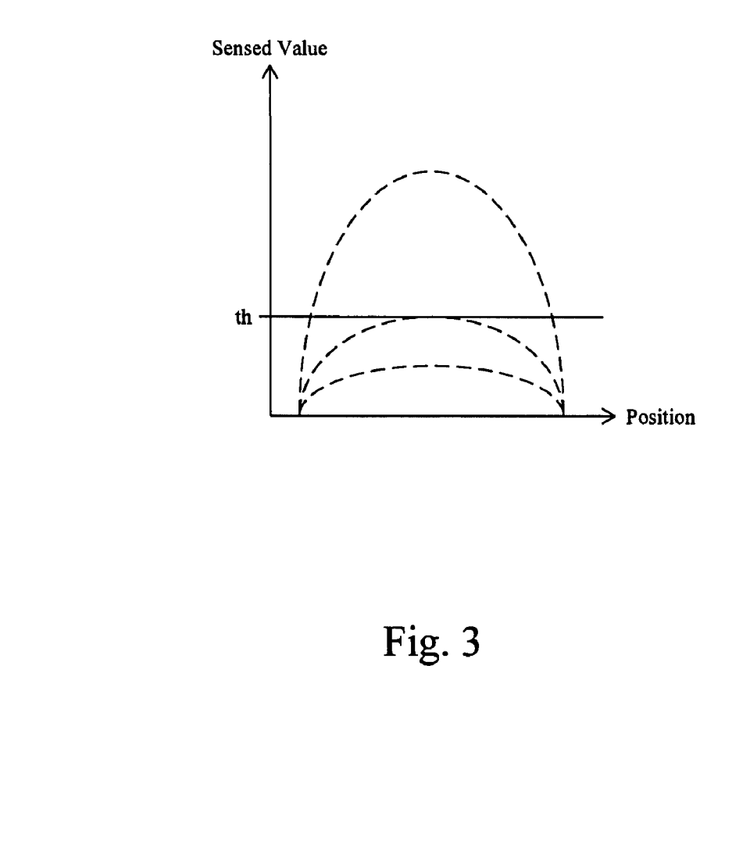
FIG. 3 shows a variation in the sensed value on the touchpad shown in FIG. 1.
Figure 4:
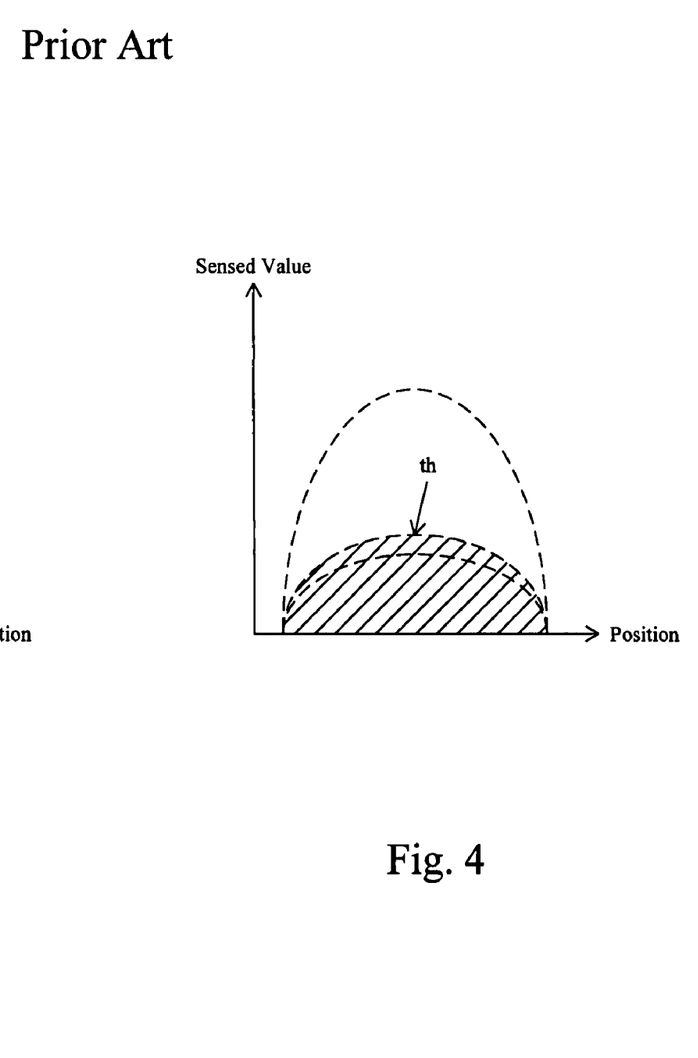
FIG. 4 shows a variation in the cumulative sensed value on the touchpad shown in FIG. 1.

FIG. 1 shows a cross-sectional view of a conventional two-dimensional capacitive touchpad 100, which comprises a panel 102, a Y-axial sensing layer 104, an insulating layer 106, an X-axial sensing layer 108, and a bottom plate 110. When a finger 112 touches on the panel 102, the sensed values (to the capacitances of the traces in the touchpad 100) on the touched position will vary, and the control circuit connected to the touchpad 100 can convert the sensed capacitive variation on the touchpad 100 to a sensed value as shown in FIG. 2, by which the position where the finger 112 touches and the moving distance and the moving direction of the finger 112 can be determined. Conventionally, there are two methods to determine whether an object touches on the touchpad 100. In the first method, the sensed value on the touchpad 100 is used to determine if an object touches the touchpad 100 by the way as shown in FIG. 3. When the sensed value is greater than a threshold th, it is determined that an object touches on the touchpad 100, and on the contrary, when the sensed value is less than the threshold th, it is determined that the object leaves the touchpad 100 or no object touches on the touchpad 100. In the second method, the cumulative sensed value on the touchpad 100 is used to determine if an object touches on the touchpad 100 by the way as shown in FIG. 4, by which if the cumulative sensed value is greater than a threshold th, it is determined that an object touches on the touchpad 100, otherwise it is determined that the object leaves the touchpad 100 or no object touches on the touchpad 100. However, these two detection methods might be interfered by external noise, which will cause erroneous determination and accordingly operation that is not desired or predicted. Moreover, the operation of drag gesture on the touchpad 100 is determined based on the time relationship when an object operates to fall down to the touchpad 100, leave from the touchpad 100, and move on the touchpad 100, and thus, for a user using the touchpad 100 first time or being unfamiliar with operating the touchpad 100, the action of the user might not be so definite that the touchpad 100 will detect thereto incorrectly and cause inconvenient use. In addition, with the trend of reducing the size of electronic products, the size of the touchpad 100 also needs to reduce. It results in inconvenience that the drag is often over the range of the touchpad 100 and thus the user needs to repeat the operation several times for a wide drag range.

Therefore, it is desired a detection method for a touchpad that will avoid noise to interfere the operation of the touchpad and have the touchpad to be easy to operate with.

SUMMARY OF THE INVENTION

An object of the present invention is to provide a gesture detection method for a touchpad to prevent the operation of the touchpad from noise interference.

In a gesture detection method for a touchpad, according to the present invention, a gesture for operation is determined by detecting if an object touches the touchpad, leaves from the touchpad, and moves on the touchpad.

DETAILED DESCRIPTION OF THE INVENTION

In a detection method for a capacitive touchpad, according to the present invention, the noise resistive capability of the touchpad is enhanced without any improvement on the hardware detection circuit of the touchpad, and a gesture for operation on the touchpad can be detected by such method.

<Detection for Verifying an Object Down>

Figure 5:
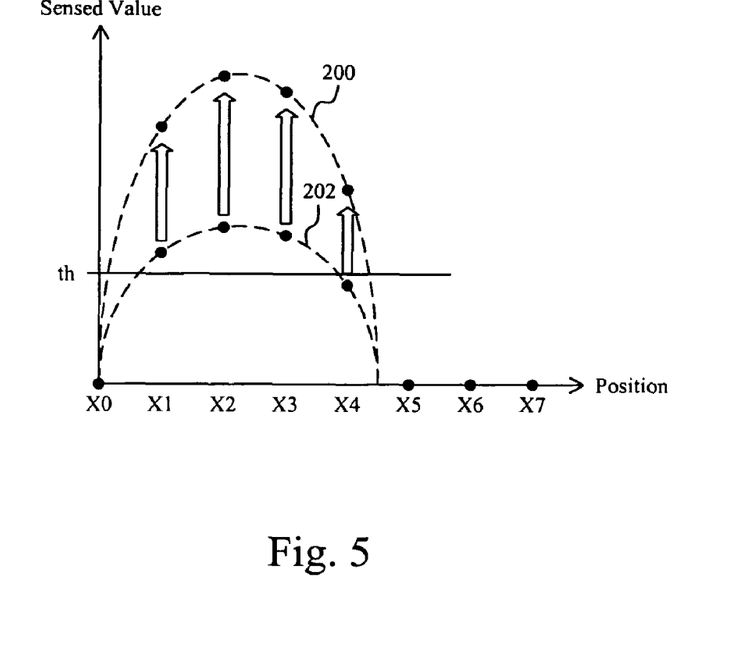
FIG. 5 shows a variation in the sensed value on the touchpad shown in FIG. 1 when the sensed value becomes greater than a down threshold.
Figure 6:
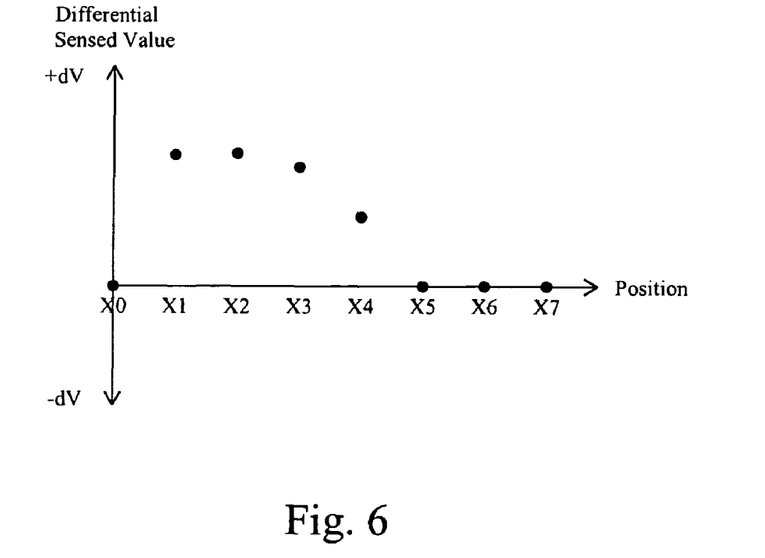
FIG. 6 shows a difference between two sensed values shown in FIG. 5.
Figure 7:
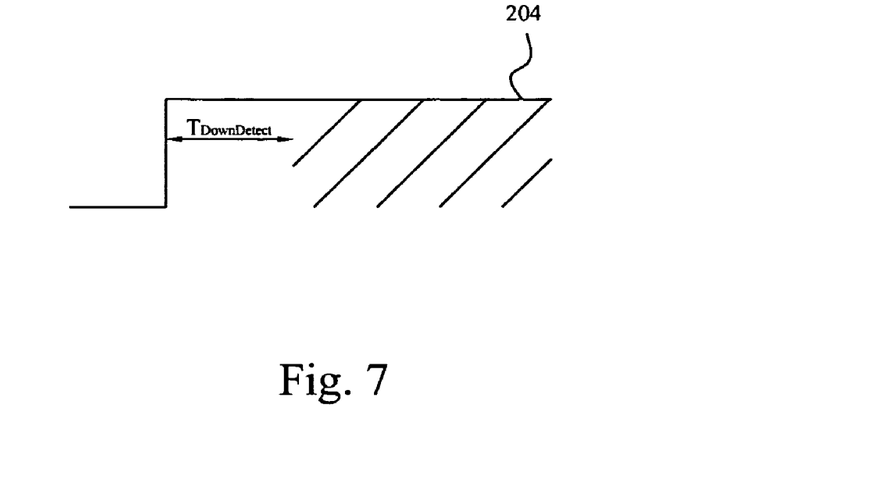
FIG. 7 shows a detected signal.

In FIG. 5, it is shown a variation of the sensed value on the touchpad 100 of FIG. 1 when the sensed value becomes greater than a down threshold th, in which curve 200 represents the sensed value at this time and curve 202 represents the sensed value at the last time. FIG. 6 shows the difference between the sensed values 200 and 202 of FIG. 5, and FIG. 7 shows a detected signal 204. In a detection of the sensed value on the touchpad 100, when the sensed value is detected greater than the down threshold th as shown in FIG. 5, the detected signal 204 will transit from low to high as shown in FIG. 7, and then, within a reference time interval $T_{DownDetect}$, the sensed value on the touchpad 100 is continuously detected and the differential sensed value dV is calculated by subtracting each current sensed value 202 by the last sensed value 200 as shown in FIG. 6. If the differential sensed value dV within the reference time interval $T_{DownDetect}$ maintains positive, it is determined that an object touches down to the touchpad 100.

<Detection for Verifying an Object Lift>

Figure 8:
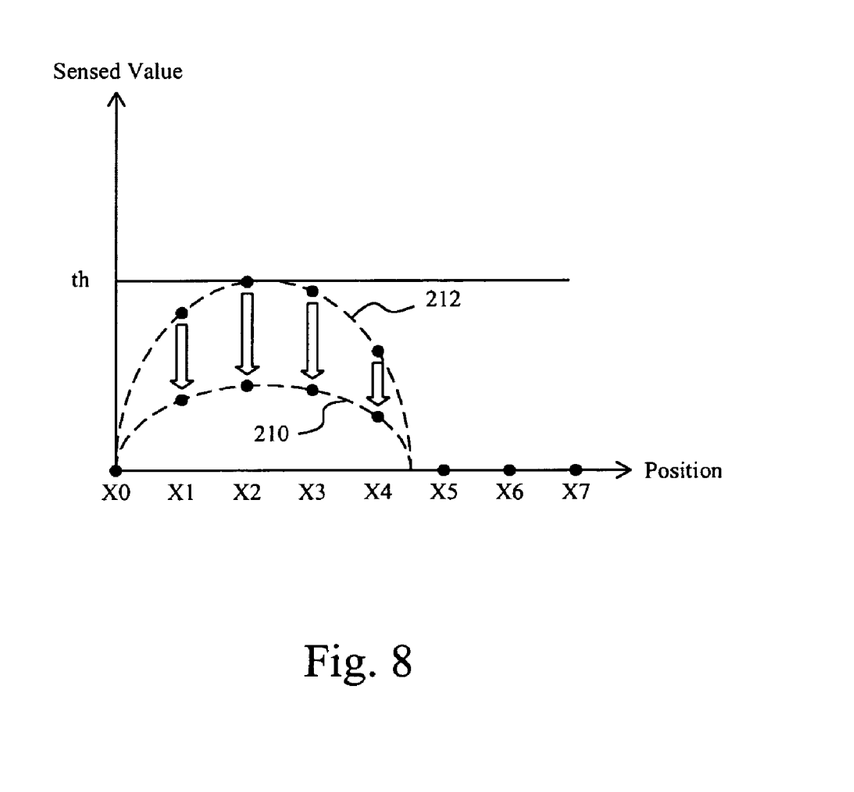
FIG. 8 shows a variation in the sensed value on the touchpad shown in FIG. 1 when the sensed value becomes less than a lift threshold.
Figure 9:
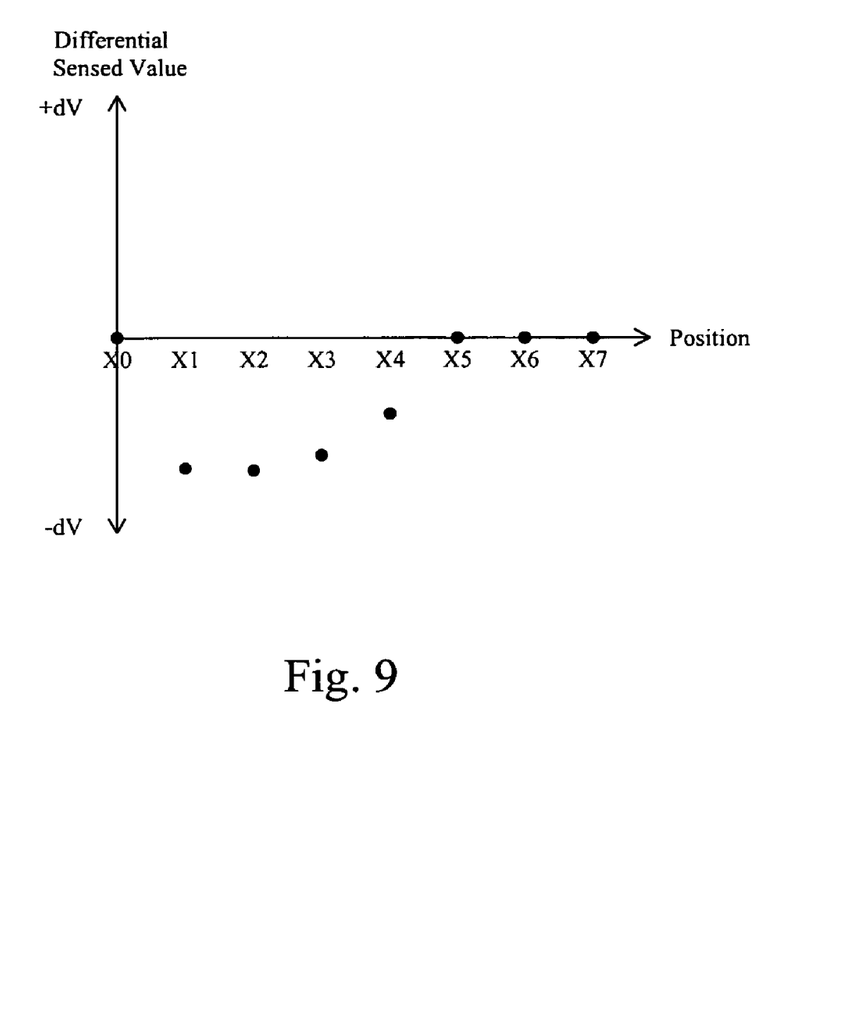
FIG. 9 shows a difference between two sensed values shown in FIG. 8.
Figure 10:
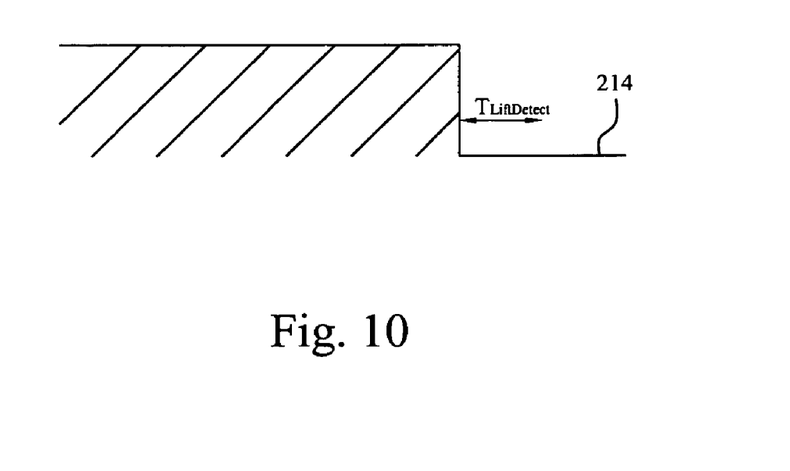
FIG. 10 shows a detected signal.

FIG. 8 shows a variation of the sensed value on the touchpad 100 of FIG. 1 when the sensed value becomes less than a lift threshold th, in which curve 210 represents the sensed value at this time and curve 212 represents the sensed value at the last time, FIG. 9 shows the difference between the sensed values 210 and 212 of FIG. 8, and FIG. 10 shows a detected signal 214. After an object has touched on the touchpad 100, once the sensed value is detected less than the lift threshold th as shown in FIG. 8, the detected signal 214 will transit from high to low as shown in FIG. 10, and then, within a reference time interval $T_{LiftDetect}$, the sensed value on the touchpad 100 is continuously detected and the differential sensed value dV is calculated by subtracting each current sensed value 210 by the last sensed value 212 as shown in FIG. 9. If the differential sensed value dV within the reference time interval $T_{LiftDetect}$ maintains negative, it is determined that the object leaves from the touchpad 100.

<Detection for Verifying an Object Moving>

Figure 11:
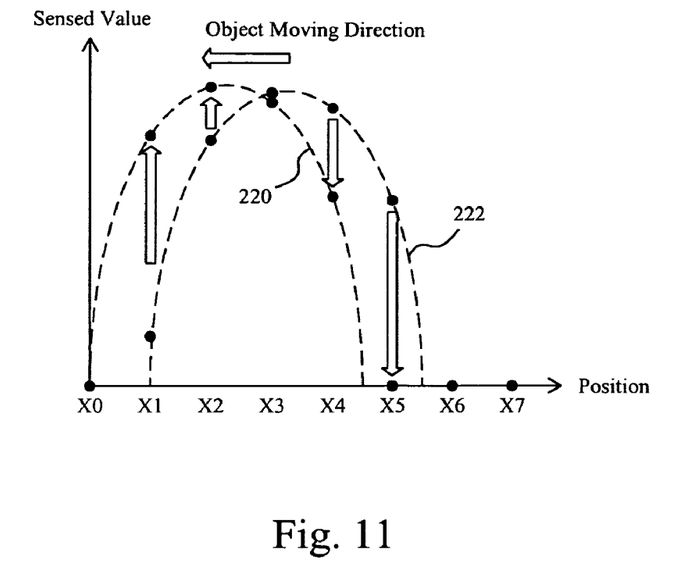
FIG. 11 shows a variation in the sensed value on the touchpad shown in FIG. 1 when an object moves from still to left side.
Figure 12:
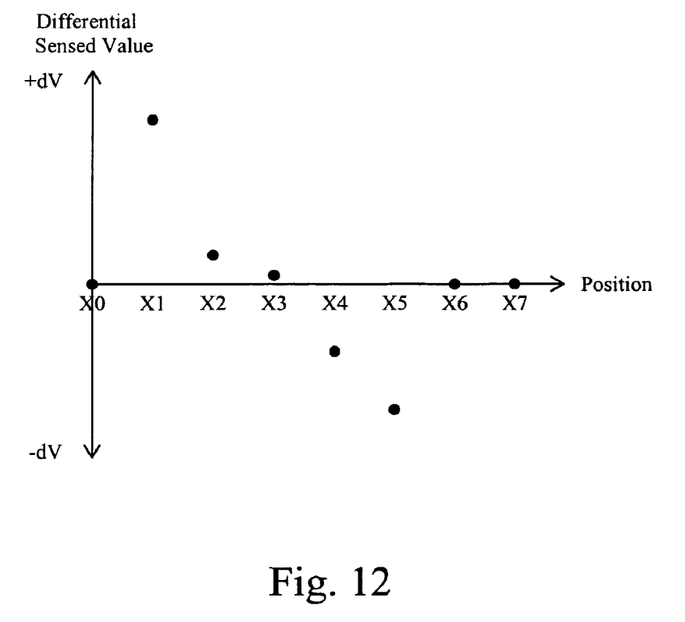
FIG. 12 shows a difference between two sensed values shown in FIG. 11.

The variation of an object on the touchpad 100 from still to move is verified to avoid noise or slight vibration of the object to cause a misjudgment on the object position which will result in the corresponding cursor to have wrong action. FIG. 11 shows a variation of the sensed value on the touchpad 100 shown in FIG. 1 when an object on the touchpad 100 moves from still to left side, in which curve 220 represents the sensed value at this time and curve 222 represents the sensed value at the last time, and FIG. 12 shows the difference between the sensed values 220 and 222 shown in FIG. 11. After an object is verified to touch on the touchpad 100, the sensed value on the touchpad 100 is continuously detected and the differential sensed value dV is calculated by subtracting each current sensed value 220 by the last sensed value 222. Within a reference time interval $T_{MovingDetect}$, if the left side of the object is detected to have the differential sensed value dV in an increasing trend and the right side of the object is detected to have the differential sensed value dV in a decreasing trend as shown in FIGS. 11 and 12, the object is determined to move from still to left side. On the contrary, within the reference time interval $T_{MovingDetect}$, if the left side of the object is detected to have the differential sensed value dV in a decreasing trend and the right side of the object is detected to have the differential sensed value dV in an increasing trend, the object is determined to move from still to right side.

<Detection for a Drag Gesture>

Figure 13:
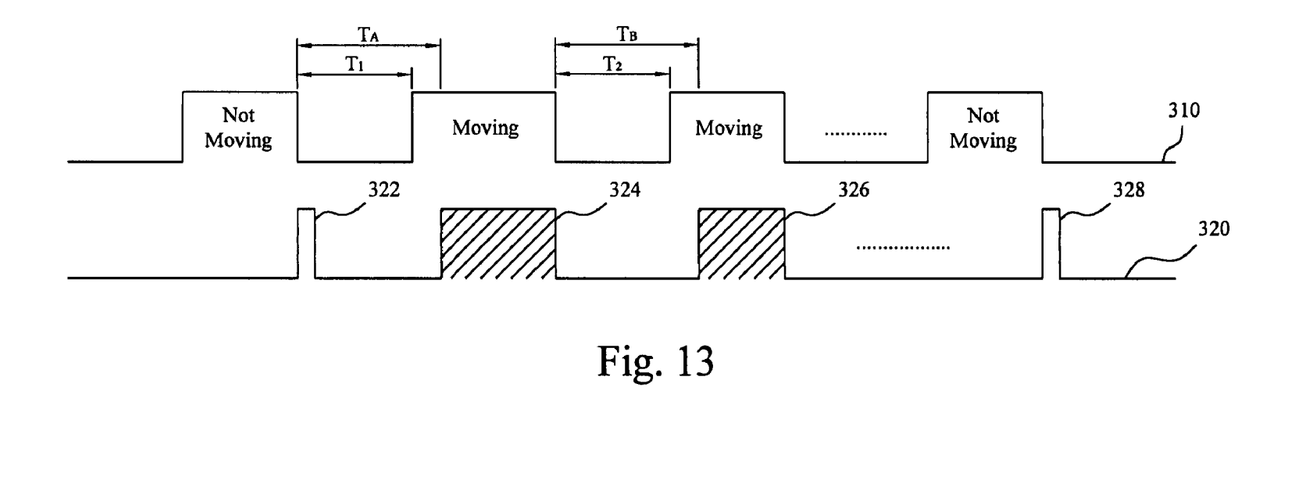
FIG. 13 shows a detected signal and an output signal of an embodiment in a drag gesture.

FIG. 13 shows a detected signal 310 and an output signal 320 in a drag gesture, and the output signal 320 includes gesture signals 322, 324, 326 and 328. When an object is detected to touch down to the touchpad 100 first time, the detected signal 310 transits from low to high, and if the detection for verifying an object down confirms that the object indeed touches down to the touchpad 100, the object is further determined whether or not to move on the touchpad 100 according to the detection for verifying an object moving. If the object is determined to move on the touchpad 100, a moving gesture is determined; otherwise the detected signal 310 will transit from high to low thereafter when the object is detected to leave the touchpad 100 and then, if the detection for verifying an object lift confirms that the object indeed leaves the touchpad 100, the gesture signal 322 (e.g., a key-press signal or a key-press and zero-displacement signal) is initialized and the departure time $T_1$ is counted after the object leaves the touchpad 100. Further, if the touchpad 100 is detected to be touched again before the departure time $T_1$ reaches a reference time interval $T_A$, the detected signal 310 transits from low to high again. After the detection for verifying an object down confirms that the touchpad 100 is indeed touched by an object again, the object is determined whether or not to move on the touchpad 100 according to the detection for verifying an object moving. If the object indeed moves on the touchpad 100, the position information of the object is calculated, the gesture signal 322 is maintained, and the position information is sent out by the gesture signal 324 (e.g., a combined signal of a key-press signal and the position information). Until the object is detected to leave the touchpad 100 again, the detected signal 310 transits from high to low again, and after the detection for verifying an object lift confirms that the object indeed leaves the touchpad 100, the gesture signal 324 is terminated and the departure time $T_2$ is counted after the object leaves the touchpad 100. Further, if the touchpad 100 is detected to be touched again before the departure time $T_2$ reaches a reference time interval $T_B$, the detected signal 310 transits from low to high again. After the detection for verifying an object down confirms that the object indeed touches down to the touchpad 100, the object is further determined whether or not to move on the touchpad 100 according to the detection for verifying an object moving. If the object is determined indeed to move on the touchpad 100, the position information of the object is calculated, the gesture signal 322 is maintained, and the position information is sent out by the gesture signal 326 (e.g., a combined signal of a key-press signal and the position information). When the object is detected to leave the touchpad 100 again, the detected signal 310 transits from high to low, and after the detection for verifying an object lift confirms that the object indeed leaves the touchpad 100, the gesture signal 326 is terminated. The foregoing steps are repeated until the detection for verifying an object down confirms that the touchpad 100 is touched by an object, and the detection for verifying an object moving confirms that the object doesn't move on the touchpad 100, and then, the detected signal 310 transits from high to low when the object is detected to leave the touchpad 100, and the gesture signal 328 (e.g., a key-release signal) is produced to terminate the gesture signal 322 after the detection for verifying an object lift confirms that the object indeed leaves the touchpad 100. Typically, the position information of an object on the touchpad 100 may have an absolute coordinate, a relative coordinate, or a relative displacement of the object. The absolute coordinate is referred to a coordinate value generated with a fixed position (e.g., the center or a corner of the touchpad 100) as the original point, the relative coordinate is referred to a coordinate value generated with a relative position (e.g., the position first touched by the object on the touchpad 100) as the original point, and the relative displacement is referred to a displacement relative to the original point.

Figure 14:
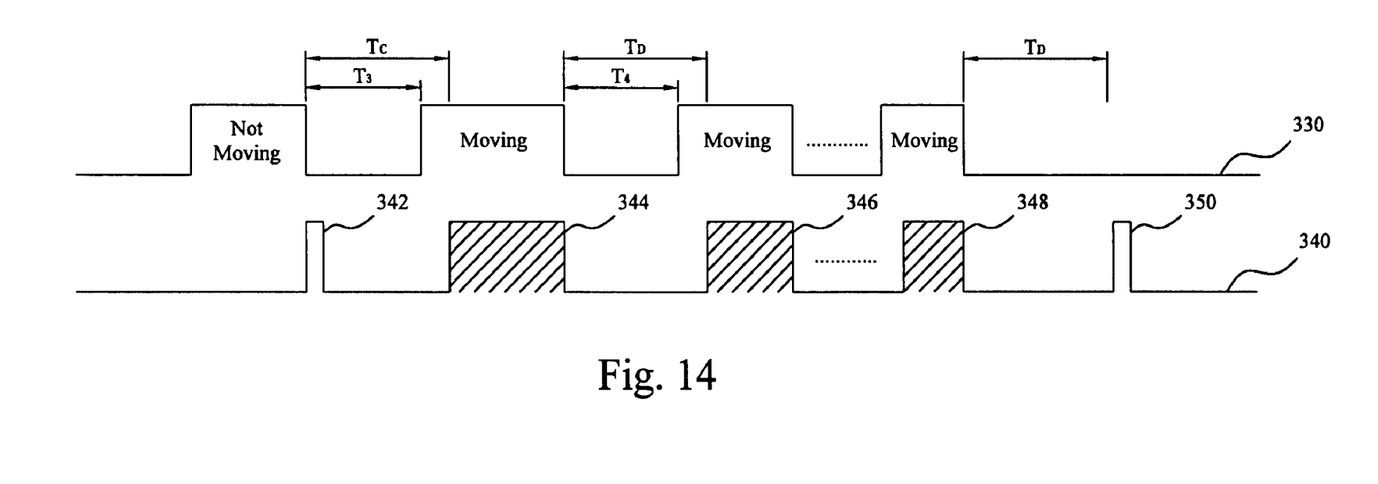
FIG. 14 shows a detected signal and an output signal of another embodiment in a drag gesture.

FIG. 14 shows a detected signal 330 and an output signal 340 in another embodiment, and the output signal 340 includes gesture signals 342, 344, 346, 348, and 350. When an object is detected to touch down to the touchpad 100 first time, the detected signal 330 transits from low to high, and if the detection for verifying an object down confirms that the object indeed touches down to the touchpad 100, the object is further determined whether or not to move on the touchpad 100 according to the detection for verifying an object moving. If the object is determined to move on the touchpad 100, a moving gesture is determined; otherwise the detected signal 330 will transit from high to low thereafter when the object is detected to leave the touchpad 100 and then, if the detection for verifying an object lift confirms that the object indeed leaves the touchpad 100, the gesture signal 342 (e.g., a key-press signal or a key-press and zero-displacement signal) is initialized and the departure time $T_3$ is counted after the object leaves the touchpad 100. Further, if the touchpad 100 is detected to be touched again before the departure time $T_3$ reaches a reference time interval $T_C$, the detected signal 330 transits from low to high again. After the detection for verifying an object down confirms that the touchpad 100 is indeed touched by an object again, the object is determined whether or not to move on the touchpad 100 according to the detection for verifying an object moving. If the object indeed moves on the touchpad 100, the position information of the object is calculated, the gesture signal 342 is maintained, and the position information is sent out by the gesture signal 344 (e.g., a combined signal of a key-press signal and the position information). When the object is detected to leave the touchpad 100 again, the detected signal 330 transits from high to low again, and after the detection for verifying an object lift confirms that the object indeed leaves the touchpad 100, the gesture signal 344 is terminated and the departure time $T_4$ is counted after the object leaves the touchpad 100. Further, if the touchpad 100 is detected to be touched again before the departure time $T_4$ reaches a reference time interval $T_D$, the detected signal 330 transits from low to high again. After the detection for verifying an object down confirms that the object indeed touches down to the touchpad 100, the object is further determined whether or not to move on the touchpad 100 according to the detection for verifying an object moving. If the object is determined indeed to move on the touchpad 100, the position information of the object is calculated, the gesture signal 342 is maintained, and the position information is sent out by the gesture signal 346 (e.g., a combined signal of a key-press signal and the position information). When the object is detected to leave the touchpad 100 again, the detected signal 330 transits from high to low, and after the detection for verifying an object lift confirms that the object indeed leaves the touchpad 100, the gesture signal 346 is terminated. The foregoing steps are repeated until the object is detected to leave the touchpad 100, the detected signal 330 transits from high to low accordingly, the detection for verifying an object lift confirms that the object indeed leaves the touchpad 100, and the gesture signal 348 (e.g., a combined signal of a key-press signal and the position information) is terminated, and then, if the touchpad is detected not to be touched within a reference time interval $T_D$ after the object leaves the touchpad 100, the gesture signal 350 (e.g., a key-release signal) is produced to terminate the gesture signal 342. Likewise, the position information of an object on the touchpad 100 may have an absolute coordinate, a relative coordinate, or a relative displacement of the object.

Figure 15A:
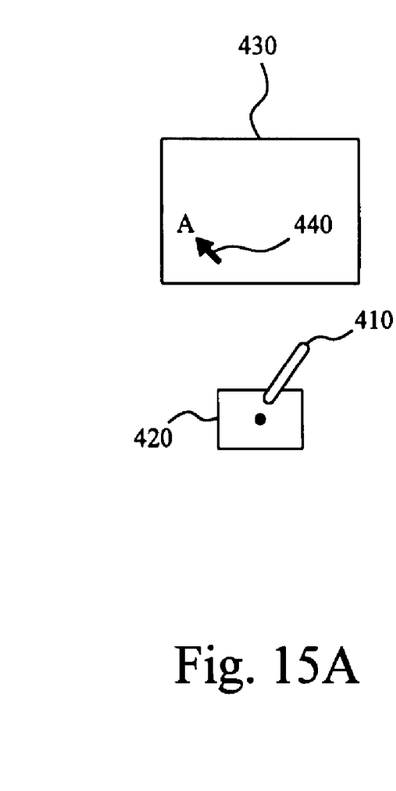
FIGS. 15A-15D show an operation to illustrate the embodiment shown in FIG. 13.
Figure 15B:
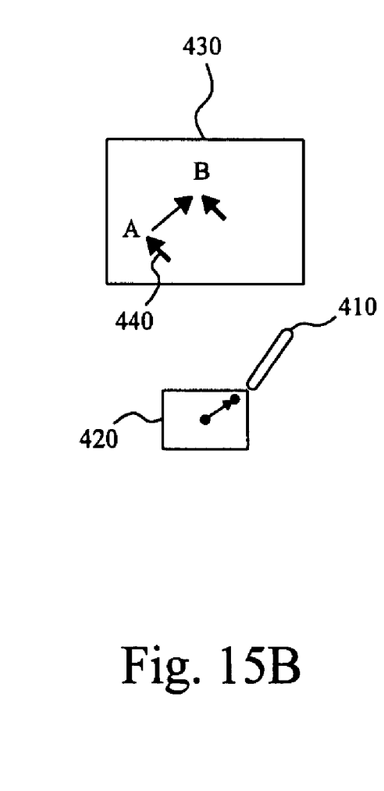
Figure 15C:
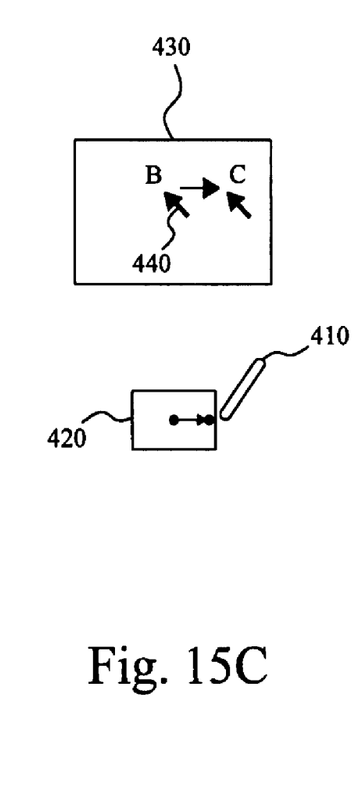
Figure 15D:
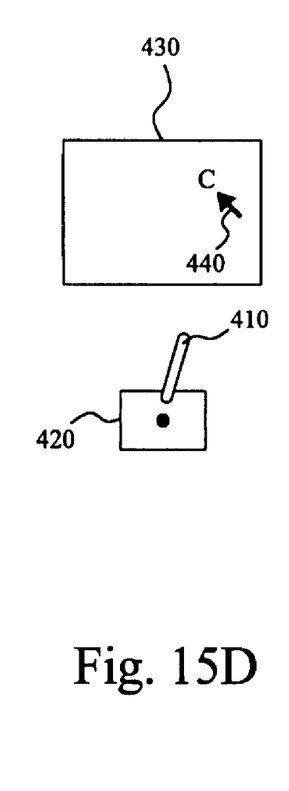

FIGS. 15A-15D show an operation to illustrate the embodiment shown in FIG. 13. In FIG. 15A, an object 410 touches and then leaves a touchpad 420. During this period, the object 410 doesn't move on the touchpad 420, an initial signal is sent out by the touchpad 420, and the cursor 440 on the monitor 430 is constantly located at a position A. In FIG. 15B, the object 410 touches the touchpad 420 again within a reference time interval after the last time the object leaves the touchpad 420, and then leaves the touchpad 420 again. During this period, the object 410 moves on the touchpad 420, and therefore, the position information of the object 410 is calculated, the initial signal is maintained, and the position information is sent out by the touchpad 420. In response thereto, the cursor 440 on the monitor 430 moves in the same direction as the moving direction of the object 410, for example from the position A to a position B. In FIG. 15C, the object 410 touches the touchpad 420 again within the reference time interval after the last time the object leaves the touchpad 420, and then leaves the touchpad 420 again. During this period, the object 410 moves on the touchpad 420, and therefore, the position information of the object 410 is calculated, the initial signal is maintained, and the position information is sent out by the touchpad 420. In response thereto, the cursor 440 on the monitor 430 moves in the same direction as the moving direction of the object 410, for example from the position B to a position C. In FIG. 15D, the object 410 touches the touchpad 420 again within the reference time interval after the last time the object leaves the touchpad 420, and then leaves the touchpad 420 again. During this period, however, the object 410 doesn't move on the touchpad 420. Therefore, a terminal signal is sent out by the touchpad 420 to terminate the initial signal, and the cursor 440 on the monitor 430 stays at the position C. The steps shown in FIGS. 15B and 15C can be repeated until the cursor 440 moves to the desired position, and then the initial signal is terminated as shown in FIG. 15D. The operation with the touchpad 420 thus becomes more convenient.

As shown in the above embodiments, a gesture for operating on a touchpad is confirmed with the variation of the sensed value and by determining whether or not the object moves on the touchpad. Therefore, in addition to avoid noise to interfere the operations of the touchpad and to avoid the touchpad to fail to identify the operation of indefinite actions, the cursor can be operated to a continuous movement, and the convenience of use is thus improved.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A method for object detection on a capacitive touchpad, comprising the steps of:
 (a) verifying that an object touches the touchpad for the first time, a sensed value being monitored for a predefined set of points in a region of the touchpad;
 (b) determining whether the object moves on the touchpad;
 (c) verifying that the object leaves the touchpad for the first time if the object does not move on the touchpad;
 (d) sending a first gesture signal;
 (e) counting a departure time after the object leaves the touchpad;
 (f) verifying that the object touches the touchpad for the second time if the departure time is shorter than a first reference time;
 (g) determining whether the object moves on the touchpad;
 (h) calculating a position information of the object if the object moves on the touchpad;
 (i) maintaining the first gesture signal to produce a second gesture signal;
 (j) verifying that the object leaves the touchpad for the second time to terminate the second gesture signal;
 (k) counting a second departure time after the object leaves the touchpad for the second time;
 (l) verifying that the object touches the touchpad for the third time if the second departure time is shorter than a second reference time;
 (m) determining whether the object moves on the touchpad; and (n) if the object does not move on the touchpad, verifying that the object leaves the touchpad for the third time and sending a third gesture signal to terminate the first gesture signal, and if the object moves on the touchpad, repeating the previous steps from the step (h);

wherein the first gesture signal is determined independent of when the object touches the touchpad for the first time and when the object leaves the touchpad; at least one of the object movement, object touching, and object leaving determinations being made based on a trend indicated by a difference between the sensed values at different times for the predefined set of points within the region of the touchpad.

2. The method of claim 1, wherein the steps of verifying that the object touches the touchpad for the first time, the second time, and the third time comprise the steps of:

monitoring a variation in the sensed value when the sensed value is greater than a threshold, the variation being a calculated difference between a present time sensed capacitive value and a last time sensed capacitive value; and determining that the object touches the touchpad if the sensed value maintains an increasing trend within a third reference time.

3. The method of claim 1, wherein the step (g) and the step (m) comprise the steps of:

monitoring a variation in the sensed value; and determining that the object moves on the touchpad if the sensed value maintains an increasing trend in a first direction and a decreasing trend in a second direction opposite to the first direction within a third reference time.

4. The method of claim 1, wherein the steps of verifying that the object leaves the touchpad for the first time, the second time, and the third time comprise the steps of:

monitoring a variation in the sensed value when the sensed value is less than a threshold; and determining that the object leaves the touchpad if the sensed value maintains a decreasing trend within a third reference time.

5. The method of claim 1, wherein the first gesture signal comprises a key-press signal.

6. The method of claim 1, wherein the first gesture signal comprises a key-press and zero-displacement signal.

7. The method of claim 1, wherein the second gesture signal comprises a combined signal of a key-press signal and the position information.

8. The method of claim 1, wherein the third gesture signal comprises a key-release signal.

9. The method of claim 1, wherein the position information comprises an absolute coordinate or a relative coordinate.

10. The method of claim 1, wherein the position information comprises a relative displacement of the object on the touchpad.

11. A method for object detection on a capacitive touchpad, comprising the steps of:

(a) verifying that an object touches the touchpad for the first time, a sensed value being monitored for a predefined set of points in a region of the touchpad;

(b) determining whether the object moves on the touchpad;

(c) verifying that the object leaves the touchpad for the first time if the object does not move on the touchpad;

(d) sending a first gesture signal;

(e) counting a first departure time after the object leaves the touchpad;

(f) verifying that the object touches the touchpad for the second time if the first departure time is shorter than a first reference time;

(g) determining whether the object moves on the touchpad;

(h) calculating a position information of the object if the object moves on the touchpad;

(i) maintaining the first gesture signal to produce a second gesture signal;

(j) verifying that the object leaves the touchpad for the second time to terminate the second gesture signal;

(k) counting a second departure time after the object leaves the touchpad for the second time;

(l) verifying that the object touches the touchpad for the third time if the second departure time is shorter than a second reference time;

(m) determining whether the object moves on the touchpad;

(n) calculating the position information of the object if the object moves on the touchpad;

(o) maintaining the first gesture signal to produce a third gesture signal;

(p) verifying that the object leaves the touchpad for the third time to terminate the third gesture signal;

(q) counting a third departure time after the object leaves the touchpad for the third time; and (r) if the third departure time is longer than second reference time, initiating a fourth gesture signal to terminate the first gesture signal, and if the third departure time is shorter than second reference time, repeating the previous steps from the step (1);

wherein the first gesture signal is determined independent of when the object touches the touchpad for the first time and when the object leaves the touchpad; at least one of the object movement, object touching, and object leaving determinations being made based on a trend indicated by a difference between the sensed values at different times for the predefined set of points within the region of the touchpad.

12. The method of claim 11, wherein the steps of verifying that the object touches the touchpad for the first time, the second time, and the third time comprise the steps of:

monitoring a variation in the sensed value when the sensed value is greater than a threshold, the variation being a calculated difference between a present time sensed capacitive value and a last time sensed capacitive value; and determining that the object touches the touchpad if the sensed value maintains an increasing trend within a third reference time.

13. The method of claim 11, wherein the step (g) and the step (m) comprise the steps of:

monitoring a variation in the sensed value; and determining that the object moves on the touchpad if the sensed value maintains an increasing trend in a first direction and a decreasing trend in a second direction opposite to the first direction within a third reference time.

14. The method of claim 11, wherein the steps of verifying that the object leaves the touchpad for the first time, the second time, and the third time comprise the steps of:

monitoring a variation in the sensed value when the sensed value is less than a threshold; and determining that the object leaves the touchpad if the sensed value maintains a decreasing trend within a third reference time.

15. The method of claim 11, wherein the first gesture signal comprises a key-press signal.

16. The method of claim 11, wherein the first gesture signal comprises a key-press and zero-displacement signal.

17. The method of claim 11, wherein the second gesture signal comprises a combined signal of a key-press signal and the position information.

18. The method of claim 11, wherein the third gesture signal comprises a combined signal of a key-press signal and the position information.

19. The method of claim 11, wherein the fourth gesture signal comprises a key-release signal.

20. The method of claim 11, wherein the position information comprises an absolute coordinate or a relative coordinate.

21. The method of claim 11, wherein the position information comprises a relative displacement of the object on the touchpad.

* * * * *